US009810175B2

(12) United States Patent
Feistel (10) Patent No.: US 9,810,175 B2
(45) Date of Patent: Nov. 7, 2017

(54) OIL SCRAPER RING (75) Inventor: Norbert Feistel, Ellikon a.d. Thur (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 13/980,682

(22) PCT Filed: Jan. 23, 2012

(86) PCT No.: PCT/EP2012/050993
§ 371 (c)(1),
(2), (4) Date: Jul. 19, 2013

(87) PCT Pub. No.: WO2012/098267
PCT Pub. Date: Jul. 26, 2012

(65) Prior Publication Data
US 2013/0307220 A1 Nov. 21, 2013

(30) Foreign Application Priority Data
Jan. 21, 2011 (EP) .................................... 11151750

(51) Int. Cl.
*F02F 5/00* (2006.01)
*F16J 15/32* (2016.01)
(Continued)

(52) U.S. Cl.
CPC ................. *F02F 5/00* (2013.01); *F16J 9/062* (2013.01); *F16J 9/203* (2013.01); *F16J 15/26* (2013.01);
(Continued)

(58) Field of Classification Search
CPC ...... F16J 9/20; F16J 9/062; F16J 9/203; F16J 9/26; F16J 15/32
(Continued)

(56) References Cited

U.S. PATENT DOCUMENTS

| 117,927 A | 8/1871 | Richards |
| 644,696 A * | 3/1900 | Swain ........................... 277/510 |

(Continued)

FOREIGN PATENT DOCUMENTS

| DE | 196 30 745 | 2/1998 |
| EP | 1446597 | 8/2004 |

(Continued)

OTHER PUBLICATIONS

International Search Report for International Application No. PCT/EP2012/050993 mailed Mar. 20, 2012.
(Continued)

*Primary Examiner* — Kristina Fulton
*Assistant Examiner* — L. Susmitha Koneru
(74) *Attorney, Agent, or Firm* — Pearl Cohen Zedek Latzer Baratz LLP (57) ABSTRACT

The oil control ring (2) extends in a circumferential direction ($2x$) about a center ($2l$) and has a longitudinal axis ($2m$) that passes through the center ($2l$), wherein the oil control ring (2) has an end face ($2d$) that faces the center ($2l$), and wherein the oil control ring (2) has a first lateral surface ($2s$), a second lateral surface ($2t$), and an outer surface ($2u$) facing away from the center ($2l$), wherein the oil control ring (2) has a plurality of channels ($2c$) extending toward the center ($2l$) on the first lateral surface ($2s$), said channels being arranged at mutual distances in the circumferential direction ($2x$) and extending over the entire width of the first lateral surface ($2s$) in the radial direction and thereby forming a fluid-conducting connection between the end face ($2d$) and the outer surface ($2u$), and wherein crown parts ($2i$) extending in the circumferential direction ($2x$) are arranged between pairs of channels ($2c$), wherein each crown part ($2i$) protrudes beyond the respective channel ($2c$) in the direction of extent of the longitudinal axis ($2m$) and forms a lateral channel surface ($2w$) for the channel ($2c$), wherein at least one of the crown parts ($5i$) is designed as a long crown part
(Continued)

($2p$) and extends over an angular range ($\alpha$) between 60 degrees and 350 degrees in the circumferential direction ($2x$). 212×2121.

16 Claims, 9 Drawing Sheets

(51) Int. Cl.
| | |
|---|---|
| *F16J 15/3212* | (2016.01) |
| *F16J 15/3208* | (2016.01) |
| *F16J 15/3272* | (2016.01) |
| *F16J 9/06* | (2006.01) |
| *F16J 9/20* | (2006.01) |
| *F16J 15/26* | (2006.01) |

(52) U.S. Cl.
CPC ........... *F16J 15/32* (2013.01); *F16J 15/3208* (2013.01); *F16J 15/3212* (2013.01); *F16J 15/3272* (2013.01)

(58) Field of Classification Search
USPC .................................. 277/459, 465, 467, 472
See application file for complete search history.

(56) References Cited

U.S. PATENT DOCUMENTS

| | | | |
|---|---|---|---|
| 2,435,943 A | 2/1948 | Nehls | |
| 3,305,241 A * | 2/1967 | Hart | ............................... 277/547 |
| 4,067,584 A | 1/1978 | Hunger | |
| 4,184,690 A * | 1/1980 | Brown | .......................... 277/515 |
| 5,474,307 A * | 12/1995 | DeBiasse et al. | ............. 277/451 |
| 6,193,236 B1 * | 2/2001 | Helpap | ........................ 277/435 |
| 6,267,380 B1 * | 7/2001 | Feistel | .......................... 277/309 |
| 6,322,080 B1 | 11/2001 | Feistel | |
| 6,959,930 B2 * | 11/2005 | Wood et al. | ................... 277/434 |
| 2004/0227301 A1 * | 11/2004 | Wood | ...................... F16J 15/26 |
| | | | 277/434 |
| 2010/0059937 A1 * | 3/2010 | Castleman et al. | ........... 277/309 |

FOREIGN PATENT DOCUMENTS

| | | |
|---|---|---|
| JP | 4-506857 | 11/1992 |
| JP | 10-148262 | 6/1998 |
| WO | WO 91/14890 | 10/1991 |
| WO | WO 95/23305 | 8/1995 |
| WO | WO 97/00396 | 1/1997 |
| WO | WO 03/044400 | 5/2003 |

OTHER PUBLICATIONS

"Polymer Inserts—Provisional design components for poly sys piston Rod scraper & seal system Design principles support holder cast or moulded to suit engine type-projected two lip scraper/ seal -triple lip projection", Original Concept Marine Sealing Services, XX, XX, Mar. 7, 2001, pp. 1-8.

* cited by examiner

OIL SCRAPER RING

CROSS-REFERENCE TO RELATED APPLICATIONS

This application is a National Phase Application of PCT International Application No. PCT/EP2012/050993, International Filing Date Jan. 23, 2012, claiming priority of European Patent Application No. 11151750.4, filed Jan. 21, 2011, which is hereby incorporated by reference.

The invention relates to an oil scraper ring.

BACKGROUND OF THE INVENTION

The document EP 1 446 597 B1 discloses an oil scraper ring which can, in particular be used as an oil barrier for piston rods of ship diesel engines. The oil scraper ring has oil scraper lips composed of plastic oriented towards the piston rod side which oil scraper lips scrape the oil present at the piston rod and, for example, supply this again to a crank housing. This known oil scraper ring has the disadvantage that the scraping is not very efficient and/or that the oil can overcome the oil scraper ring.

SUMMARY OF THE INVENTION

It is the object of the invention to form an advantageous oil scraper ring which ensures a reliable oil scraping during a long period of operation.

The object is in particular satisfied by an oil scraper ring which extends in a circumferential direction about a center and which has a longitudinal axis extending through the center, wherein the oil scraper ring has an end face oriented towards the center, and wherein the oil scraper ring comprises a first side surface, a second side surface, as well as an outer surface facing away with respect to the center, wherein the oil scraper ring has a plurality of passages extending towards the center at the first side surface, which passages are mutually spaced apart in the circumferential direction and which extend in the radial direction over the complete width of the first side surface and thereby form a fluid conducting connection between the end face and the outer surface, and wherein a respective crown part extending in the circumferential direction is arranged between two passages, wherein the crown part respectively projects over the passage in the direction of extent of the longitudinal axis and in this connection forms a passage side surface for the passage, wherein at least one of the crown parts is configured as a long crown part and extends over an angular range a between 60 degrees and 350 degrees in the circumferential direction.

The long crown part is preferably configured such that the long crown part has no outlet in the radial direction.

The oil scraper ring in accordance with the invention is preferably used in connection with an oil scraper ring package, preferably for sealing a horizontally running piston rod. At least two oil scraper rings are arranged lying next to one another in the oil scraper ring package, wherein the long crown parts are arranged above the piston rod, advantageously, such that all oil scraper rings are identically positioned with respect to the piston rod, wherein the oil scraper rings mutually touch one another. The long crown parts arranged above the piston rod have the effect that oil scraped from the piston rod by the oil scraper rings cannot escape upwardly from the oil scraper ring package, and, thus can only escape following the gravitational force downwardly and possibly laterally. This embodiment has the advantage that the oil can generally be scraped better from the piston rod and/or has the advantage that less oil can overcome the oil scraper ring package.

The invention is further satisfied, in particular by an oil scraper ring comprising a holding ring, as well as comprising a scraper having a scraper lip, wherein the scraper is arranged in the holding ring, such that the scraper lip is oriented towards the center of the oil scraper ring, in order to scrape oil at a piston rod, wherein the scraper is composed of a plurality of scraper segments arranged following one another in the circumferential direction of the oil scraper ring, and wherein the holding ring has a groove for the form-fitted reception of the scraper segments, and wherein the holding ring has an abutment position, and wherein the holding ring has at least one first end face made of plastic oriented towards the center of the oil scraper ring, and wherein the scraper is composed of a material having a larger hardness than the plastic forming the first end face, wherein the scraper lip of the scraper has a contact position oriented towards the center and wherein the scraper and the holding ring are configured mutually adapted such that both the at least first end face and also the contact position can lie at the piston rod.

The oil scraper ring in accordance with the invention has the advantage that this enables a substantial and efficient scraping of the oil present at the piston rod and that the oil scraper ring only has a small wear. In an advantageous embodiment the oil scraper ring in accordance with the invention comprises a scraper which has a larger hardness than the material of the holding ring which forms the first end face and which is determined for abutment at the piston rod. Such a scraper has a stable and, preferably also sharp, scraping edge which ensures an efficient scraping of the oil. Moreover, the oil scraper ring in accordance with the invention comprises a holding ring which has a first end face formed of plastic which is oriented towards the piston rod and which is determined for the contact at the piston rod. The oil scraper ring in accordance with the invention is configured in an advantageous embodiment such that both the first end face and also the scraping edge can simultaneously lie at the piston rod which has the consequence that the scraping edge only contacts at the piston rod with very little pressure or even no pressure, since a part of the, in particularly radially inwardly acting, forces are transferred via the first end face. The scraping edge thereby experiences a very small wear. Moreover, the position and orientation of the scraping edge is stabilized with respect to the piston rod, by the end face of the holding ring lying at the piston rod, and, in particular is stabilized also with respect to any arising movement. In a particularly advantageous embodiment the material forming the first end face is composed of a plastic with very good dry running properties, such as a filled PTFE or a high temperature poly-mer modified with filling materials suitable for dry running, such as PTFE, MoS2, graphite etc. The scraper or the complete oil scraper ring, with or without scraper, is preferably composed of a metal, such as grey cast, bronze and aluminum or of a plastic, in particular of a high temperature polymer such as PEEK, polyimide or PPS.

The scraper is composed of a plurality of scraper segments. The holding ring can be of one piece design or can be formed from a plurality of holding ring segments. The holding ring as well as the scraper ring are preferably designed and mutually adapted such that the lips of the scraper rings at least partly abut the holding ring, such that the lip is protected from an excessive load, since a force engaging at the scraper ring or respectively at the lip is directly transferred to the holding ring.

The oil scraper ring in accordance with the invention is, in particular particularly suitable for dry running compressors, since for a dry running compressor the contamination of the gas to be compressed by means of lubricant should safely be avoided. Moreover, already small oil leaks which penetrate into a dry running piston rod sealing system bring about its fast destruction. The reliable function of the oil scraper system is particularly important on the compression of oxygen. In this example, oil leaks can even lead to a fire. However, also when no acute danger from oil leaks is present, this at least leads to increased costs of operation, as well as to an environmental load, since the lubricant lost on the crank operation has to be continuously replaced and the leaking oil must be discarded.

The oil scraper ring in accordance with the invention is preferably used in an oil scraper ring package comprising a plurality of oil scraper rings arranged behind one another in the direction of extent of a piston rod.

The invention will be described in the following with reference to embodiments in detail.

BRIEF DESCRIPTION OF THE DRAWINGS

The drawings used for explaining the embodiments show.

Generally like parts are referred to using the same reference numerals in the drawings.

DETAILED DESCRIPTION OF THE PREFERRED EMBODIMENTS

Figure 1:
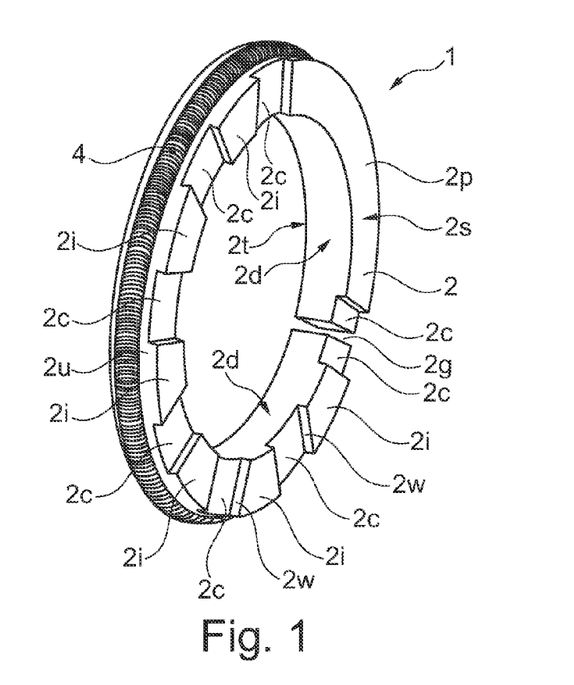
FIG. 1 a perspective view of a first embodiment of an oil scraper ring.
Figure 2:
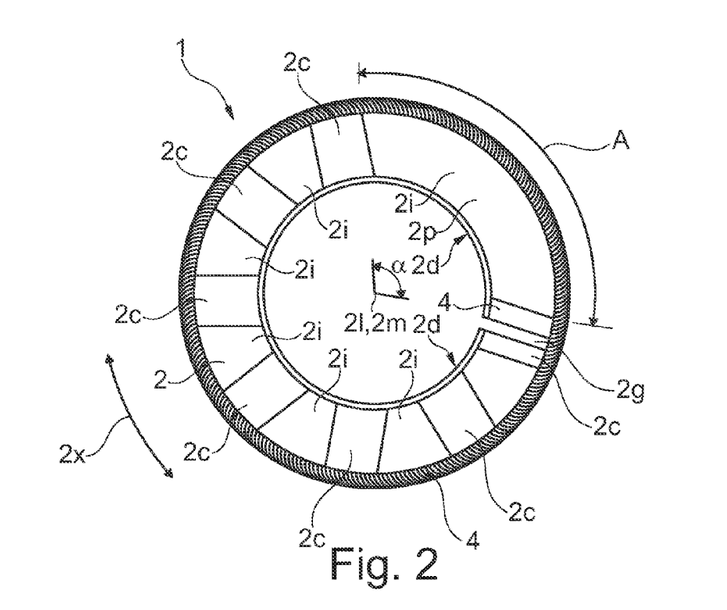
FIG. 2 a top view of the oil scraper ring in accordance with FIG. 1.

FIG. 1 in a perspective view and FIG. 2 in a top view show an oil scraper ring 2 which extends in a circumferential direction 2x about a center 2l and which has a longitudinal axis 2m extending through the center 2l, wherein the oil scraper ring 2 has an end face 2d orientated towards the center 2l, and wherein the oil scraper ring 2 has a first side surface 2s, a second side surface 2t, as well as an outer surface 2u facing away with respect to the center 2l. The oil scraper ring 2 has a plurality of passages 2c extending towards the center 2l at the first side surface 2s which passages are mutually spaced apart in the circumferential direction 2x and which passages extend in the radial direction over the complete width of the first side surface 2s and thereby form a fluid conducting connection between the end face 2d and the outer surfaces 2u. A crown part 2i is arranged extending in the circumferential direction between two passages 2c, wherein the crown part 2i respectively projects over the passage 2c in the direction of extent of the longitudinal axis 2m and in this connection forms a passage side surface 2w for the passage 2c. At least one of the crown parts 2i is configured as a long crown part 2p and extends in the direction of extent 2x over an angular range a between 60 degrees and 350 degrees. The oil scraper ring 2 moreover has a gap 2g, which in the illustrated embodiment is arranged in a passage 2c. The oil scraper arrangement 1 comprises an oil scraper ring 2, as well as a clamping element 4 surrounding an oil scraper ring 2 along the outer surface 2u and lying in a recess 2k.

Figure 3:
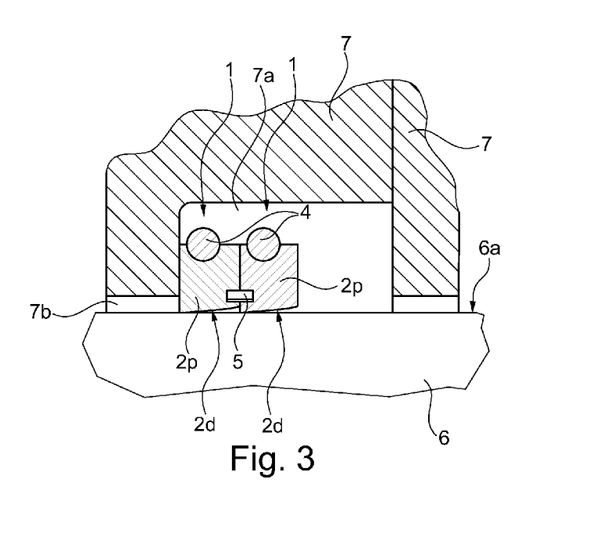
FIG. 3 a section through a horizontally arranged package comprising a plurality of oil scraper rings arranged following one another, wherein two are illustrated.

FIG. 3 shows a horizontally extending oil scraper ring package, wherein two oil scraper rings 2 arranged following one another in the direction extent of a piston rod 6 are illustrated. The long crown parts 2p are arranged above and lying next to one another in the direction of extent to the piston rod 6. The long crown parts 2p thereby form a barrier to the top in order to prevent that oil scraped at the end face 2d from the piston rod 6 can directly arrive in the upper inner space 7a of the housing 7. Advantageously a security against rotation 5, such as a pin, is further provided in order to prevent a rotation of the oil scraper rings 2 with respect to one another. Advantageously all long crown parts 2p are arranged with respect to the piston rod 6 in an identical position.

Figure 4:
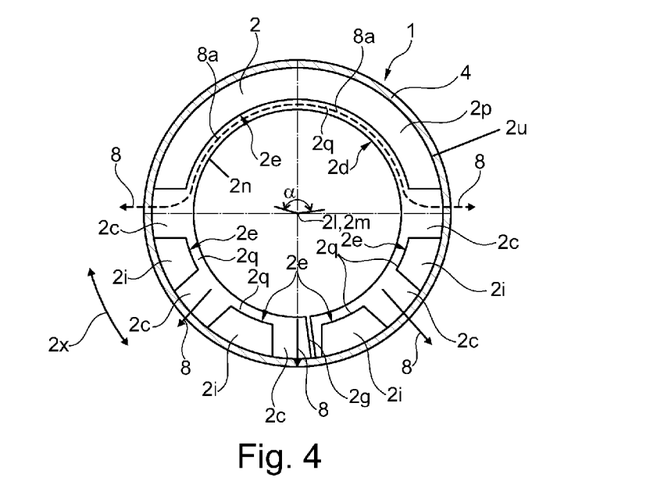
FIG. 4 a top view of a further embodiment of an oil scraper ring.
Figure 5:
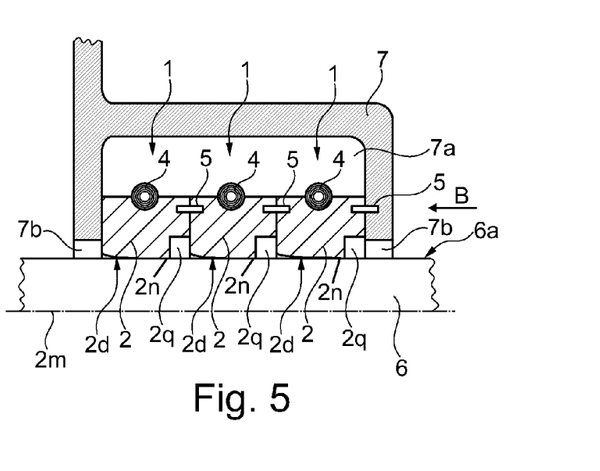
FIG. 5 a section through a horizontally arranged package comprising three oil scraper rings illustrated following one another as in FIG. 4.

FIG. 5 shows a horizontally extending oil scraper ring package comprising three oil scraper rings 2 arranged following one another in the direction of extent to the piston rod 6. FIG. 4 shows a front view from the direction B of an oil scraper ring 2 arranged in FIG. 5. As illustrated in FIG. 4 a recessed end face 2e is arranged set back with respect to the end face 2d in the radial direction, such that an intermediate 2q is formed between the long crown part 2p and the surface 6a of the piston rod 6, and such that a scraper lip 2n is formed between the first end face 2d and the intermediate 2q. The first end face 2d, as illustrated in FIG. 5 at least partly contacts at the surface 6a of the piston rod 6, such that oil is scraped which, as illustrated with the fluid flow 8, escapes to the outside via the passages 2c. The passages 2c are arranged at the bottom in the circumferential direction 2x preferably at least along an angular range of 60 degrees, wherein a respective crown part 2i is arranged between two passages 2c. Advantageously, each passage 2c has a width corresponding to an angular range of at least 10 degrees in the circumferential direction 2x, such that each of the passages 2c extend over an angular range of at least 10 degrees in the direction of extent 2x. A substantially semicircular long crown part 2p is arranged at the top between the left and right arranged passage 2c in the illustrated embodiment, which crown part 2p extends over an angular range of at least 60 degrees in dependence on the embodiment. The long crown part 2p is configured continuously in the circumferential direction such that the crown part 2p has no outlet. This embodiment has the advantage that the scraped oil, as illustrated by the fluid flow 8, can only escape downwardly, since the oil scraper ring 2 does not have a continuous passage 2c towards the top in the radial direction. In a particularly advantageous embodiment, oil scraper rings 2 arranged next to one another, as illustrated in FIG. 5, have a security against rotation, for example, a fixing pin 5, in order to prevent a rotation of the oil scraper rings 2 with respect to one another and, in order to preferably also prevent a rotation of the oil scraper ring 2 with respect to the housing 7.

Figure 6:
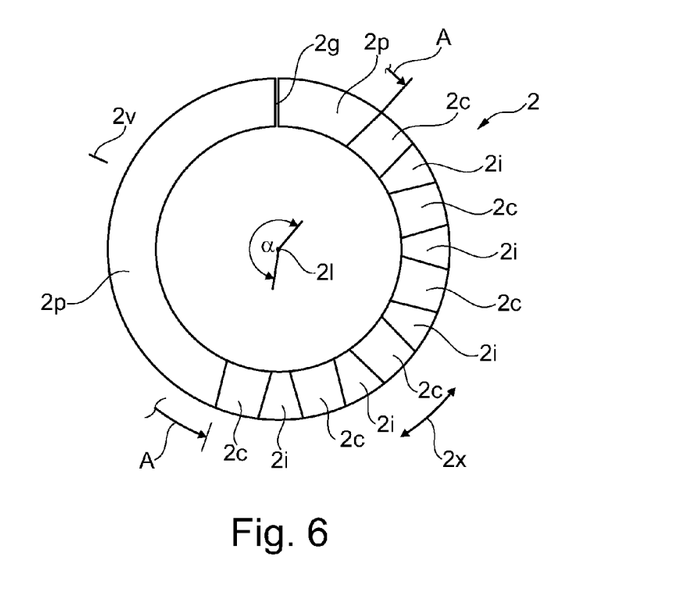
FIG. 6 a top view of a further embodiment of an oil scraper ring.

FIG. 6 shows a further embodiment of an oil scraper ring 2 in a top view having a long crown part 2p and having a plurality of passages 2c and crown parts 2i arranged in the circumferential direction 2x. The long crown parts 2p extends over an angle α of more than 180 degrees, wherein the radial gap 2g extends in the long crown part 2p. The oil scraper ring 2 is advantageously arranged in an oil scraper ring package such that the position referred to with 2v is arranged at the top, such that the crown part 2p, starting from the position 2v, extends over an angular range of at least 30 degrees in both directions of circumference.

The oil scraper rings 2 illustrated in FIGS. 1 to 5 are preferably made of a plastic.

Figure 7:
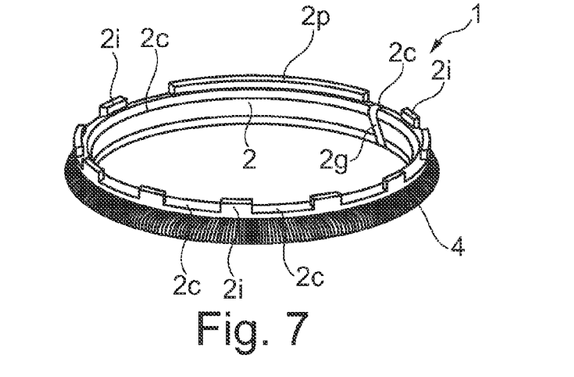
FIG. 7 a perspective view of a further embodiment of an oil scraper ring.
Figure 8:
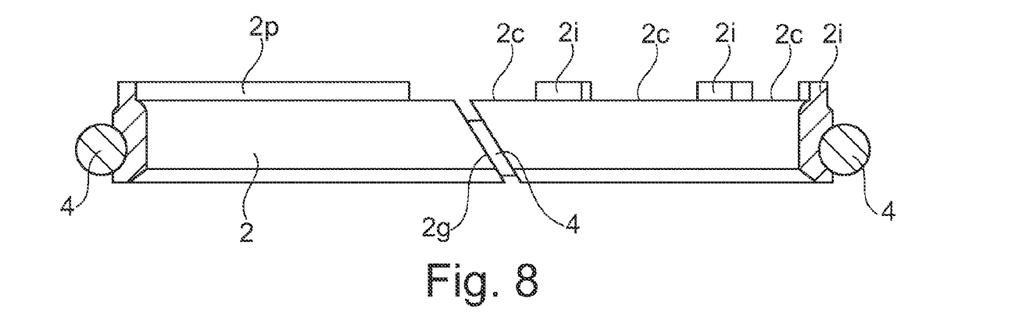
FIG. 8 a cross-section through the oil scraper ring illustrated in FIG. 7.

FIG. 7 in a perspective view and FIG. 8 in a section show a further embodiment of an oil scraper ring 2 which is surrounded by a clamping element 4. This oil scraper ring 2 is manufactured of metal, preferably of brass.

The oil scraper ring 2 in turn has a long crown part 2p and in the circumferential direction 2x has a plurality of passages 2c and crown parts 2i. The abutment position 2g is configured running inclined in the illustrated embodiment, wherein a part of the clamping element 4 is still visible behind the abutment position 2g.

Figure 9:
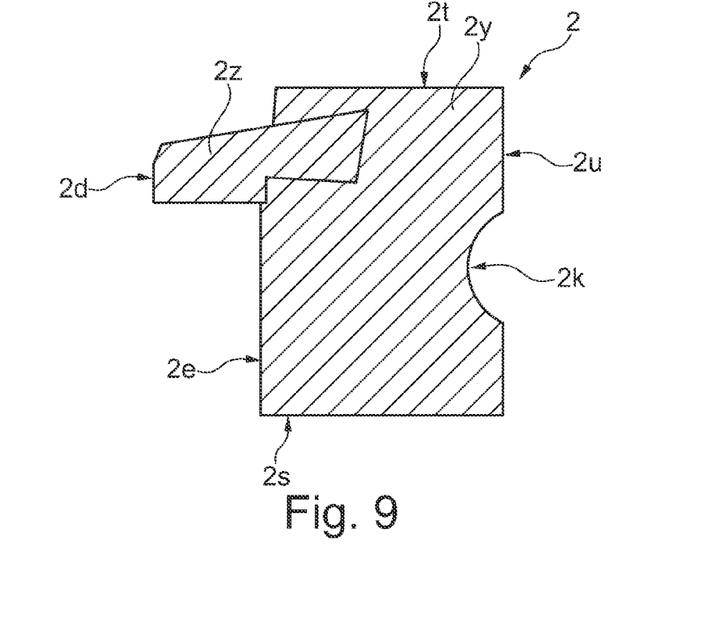
FIG. 9 a cross-section through a further embodiment of an oil scraper ring.

FIG. 9 shows a further embodiment of an oil scraper ring 2 in a section. The oil scraper ring 2 is composed of at least a first ring part 2y and a second ring part 2z, wherein the first and the second ring part 2y, 2z are connected to one another, preferably fixedly connected to one another, wherein the second ring part 2z is arranged between a center 2l and the first ring part 2y, and wherein the second ring part 2z is preferably corn-posed of a plastic, and wherein the second ring part 2z forms the end face 2d. The first ring part 2y can be formed of a plastic or also of a metal. The recessed end face 2e is arranged set back with respect to the first end face 2d, such that only the first end face 2d contacts at the surface 6a of the piston rod 6.

Figure 10:
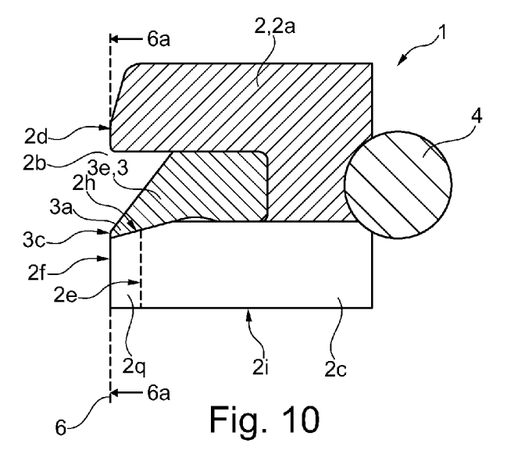
FIG. 10 a cross-section through the oil scraper ring along the sectional line C-C.
Figure 11:
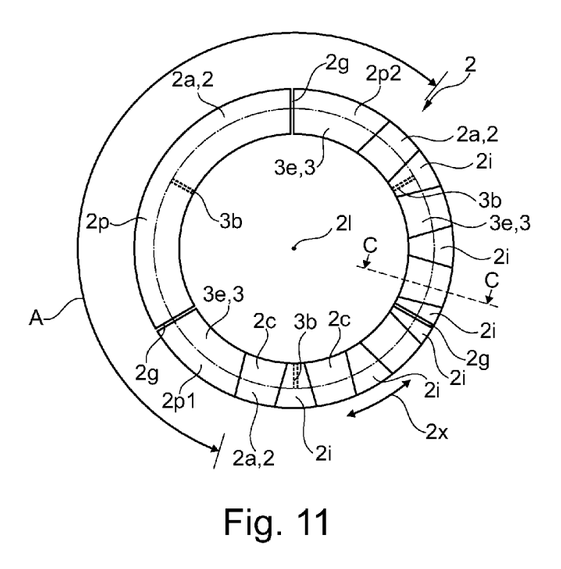
FIG. 11 a view from below of the oil scraper ring in accordance with FIG. 9.

FIG. 10 shows an oil scraper ring 2 having a clamping element 4 along the sectional line C-C illustrated in FIG. 11. FIG. 11 shows the same oil scraper arrangement 1 in a view from below. As is clear from FIG. 11, the oil scraper ring 2 is composed of three holding ring segments 2a arranged following one another in the circumferential direction 2x, with a respective radially running abutment position 2g being present between the holding ring segments 2a. The oil scraper ring 2 can also only be composed of two holding ring segments 2a or also of more than three holding ring segments 2a. The oil scraper ring 2 has crown parts 2i arranged spaced apart in the circumferential direction 2x between which crown parts a passage 2c respectively extending in a radial direction with respect to the center 2l of the oil scraper ring 2 is arranged. A scraper 3 is arranged in the oil scraper ring 2 which scraper, in the illustrated embodiment, is composed of three scraper ring segments 3e arranged behind one another in the circumferential direction, wherein a respectively radially extending abutment part 3b is present between the scraper ring segments 3e. The scraper 3 can also only be composed of two scraper segments 3e or also of more than three scraper segments 3e. In the assembled state the oil scraper ring 2, moreover, as illustrated in FIG. 1, comprises a clamping element 4 such as a spring, which encloses the oil scraper ring 2 from the outside, and brings about a bias acting against the center 2l onto the oil scraper ring 2 or the scraper 3 respectively.

FIG. 10 shows the oil scraper ring 2 and/or a holding ring segment 2a which has a surrounding groove 2b in which the scraper 3 respectively the scraper ring segment 3e is arranged. The scraper 3 has a scraper lip 3a which has a contact position 3c at its tip. The scraper 3 is preferably corn-posed of a metal, such as grey cast, bronze, brass and aluminum or of a high temperature polymer, such as PEEK, polyimide or PPS. The scraper 3 is composed of a material having a larger hardness than the plastic of the oil scraper ring 2 forming the first end face 2d, 2f. The scraper 3 is arranged in the oil scraper ring 2 such that the scraper lip 3a, as well as the contact position 3c are oriented towards the center 2l of the oil scraper ring 2 in order to scrape oil from a surface 6a of a piston rod 6, only hinted at in the illustration. The groove 2b of the oil scraper ring 2 is advantageously configured adapted with respect to the scraper segment 3a such that the groove 2b permits a form-fitted reception of the scraper segment 3a. The oil scraper ring 2 comprises at least one end face 2d, 2f of plastic oriented towards the center 2l of the scraper ring 1. The scraper 3 and the oil scraper ring 2 are configured mutually adapted such that both the at least first end face 2d and also the contact position 3c can simultaneously contact the piston rod 6. In an advantageous embodiment the oil scraper ring 2 comprises a first and a second end face 2d, 2f which both project the same distance in the direction towards the center 2l of the oil scraper ring 1, so that both end faces 2d, 2f can lie at the surface 6a of the piston ring 6. In a particularly advantageous embodiment the material forming the first end face 2d is a material with very good dry running properties, such as a filled PTFE or a high temperature polymer modified with filling materials suitable for the dry running, such as PTFE, MoS2, graphite etc. The first and second end face 2d, 2f are mutually separated via a groove 2b extending in the circumferential direction 2x. FIG. 10 moreover shows a passage 2c running in a radial direction which passage is laterally bounded by the crown part 2i. The oil scraper ring 2 has a long crown part 2p which in the illustrated embodiment extends over the three segments and over an angle and/or a length A of more than 180 degrees.

In a further embodiment the second end face 2f, as illustrated in FIG. 10 in a dotted manner and referred to with recessed end face 2e, can be arranged set back so that an intermediate space 2q is formed between the recessed end face 2e and the surface 6a.

Figure 12:
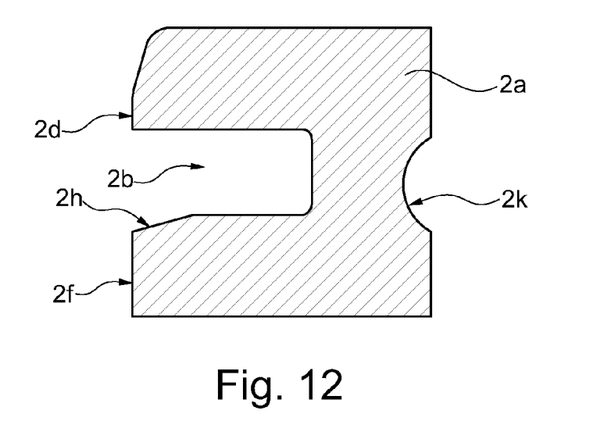
FIG. 12 a cross-section through a holding ring segment along the sectional line D-D.

FIG. 12 shows the holding ring segment 2a with its groove 2b as well as the first and second end faces 2d, 2f again in detail. The holding ring segment 2a further has a recess 2k for the reception of the clamping element 4. The groove 2b has an extent towards the center 2l, in the illustrated embodiment, in which extent the groove 2b has a support surface 2h running transverse or oblique to the surface 6a of the piston rod 6 which support surface, as illustrated in FIG. 10, is arranged and configured such that this serves as a support for the scraper 3.

Figure 13:
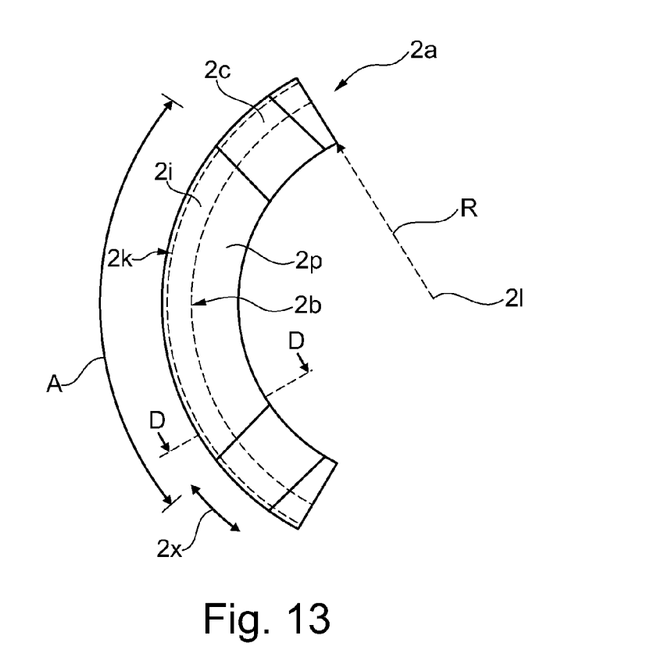
FIG. 13 a top view onto the holding ring segment.

FIG. 13 shows a further embodiment of a holding ring segment 2a which could be suitable for an oil scraper ring 2 illustrated in FIG. 11. The holding ring segment 2a has an inner radius R.

Figure 14:
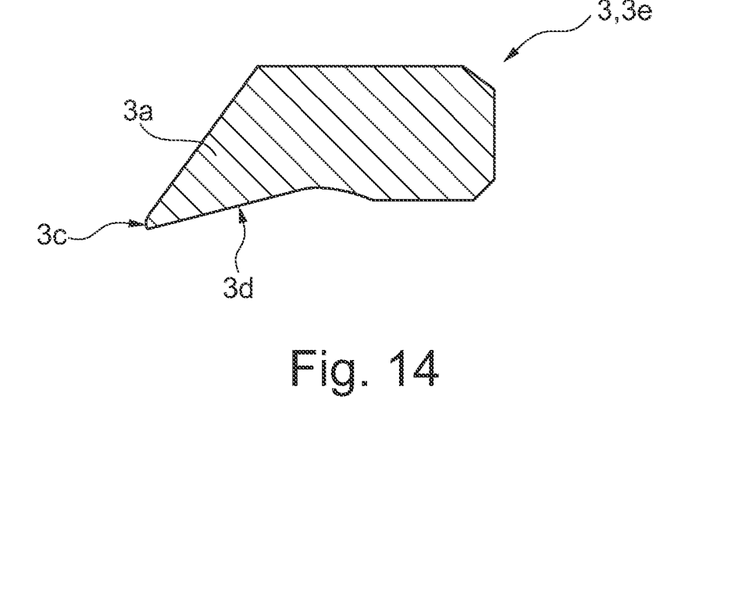
FIG. 14 a cross-section through a scraper along the sectional line C-C.

FIG. 14 shows a section through the scraper ring segment 3e illustrated in Detail in FIG. 10. The scraper ring segment 3e comprises a scraper lip 3a, a support surface 3d, as well as a contact position 3c which is determined for the contact at the piston rod 6. The scraper ring segment 3e preferably is composed of metal so that the contact position 3c is preferably configured as a sharp scraping edge.

Figure 15:
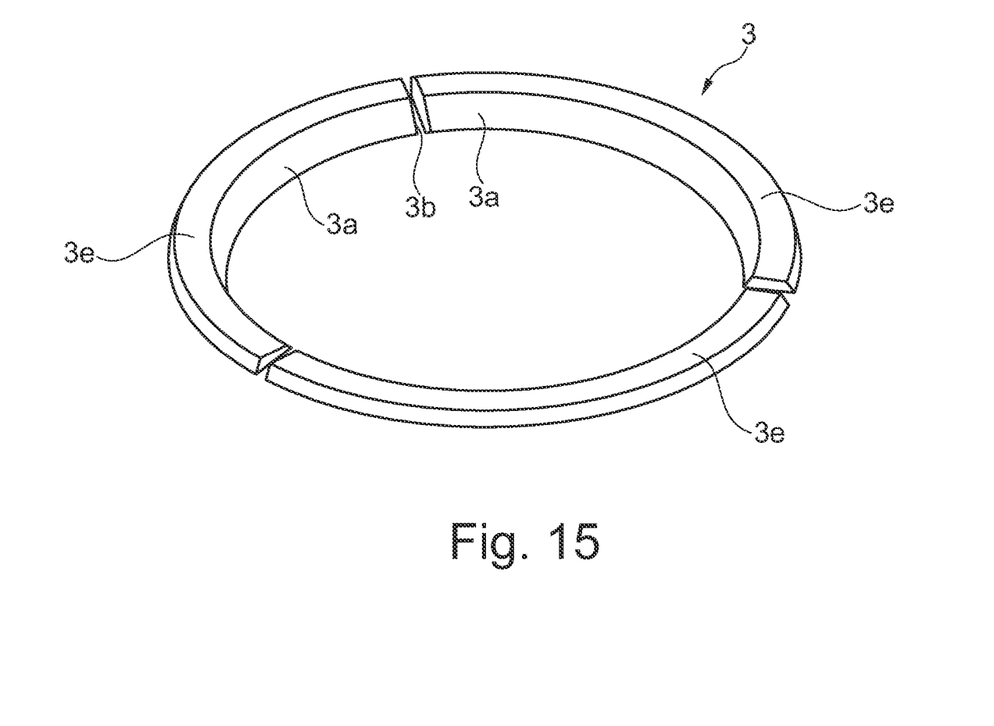
FIG. 15 a perspective view of a scraper.

FIG. 15 shows the scraper 3 already illustrated in FIGS. 10, 11 and 14 in a perspective view. The oil scraper ring 2 in accordance with the invention has the advantage that the contact position 3c of the scraper 3 preferably brings about no or only a small force acting on the surface 6a of the piston rod 6, since forces acting towards the center 2l brought about by the spring 4 can be transferred substantially or completely via the first end face 2d and the possibly present second end face 2f onto the surface 6a of the piston rod 6. The scraper 3 can thus be configured such that this is optimized for an as high as possible scraping effect. In particular the cross-section of the scraper ring or respectively its dimension in radial and/or axial direction can be reduced to a minimum whereupon, also on use of a metal, a good matching of the individual segments to the piston rod 6 results. For maintaining the scraping function with increasing wear, the scraper ring is composed of at least two preferably three segments 3e having an abutment 3b with play dimensioned for the desired wear. The oil scraper ring 2 can be of one piece design or of multi piece design, preferably of three piece design and likewise includes an abutment 2g with play for wear compensation. To avoid oil leakages by the abutments 2g, 3b the oil scraper ring 2 and the scraper 3 are arranged such that they seal one another against the abutments 2g, 3b and thus no continuous leakage paths are present in the running direction of the piston rod 6. In this way a good scraping effect is ensured also on increasing wear.

Figure 19:
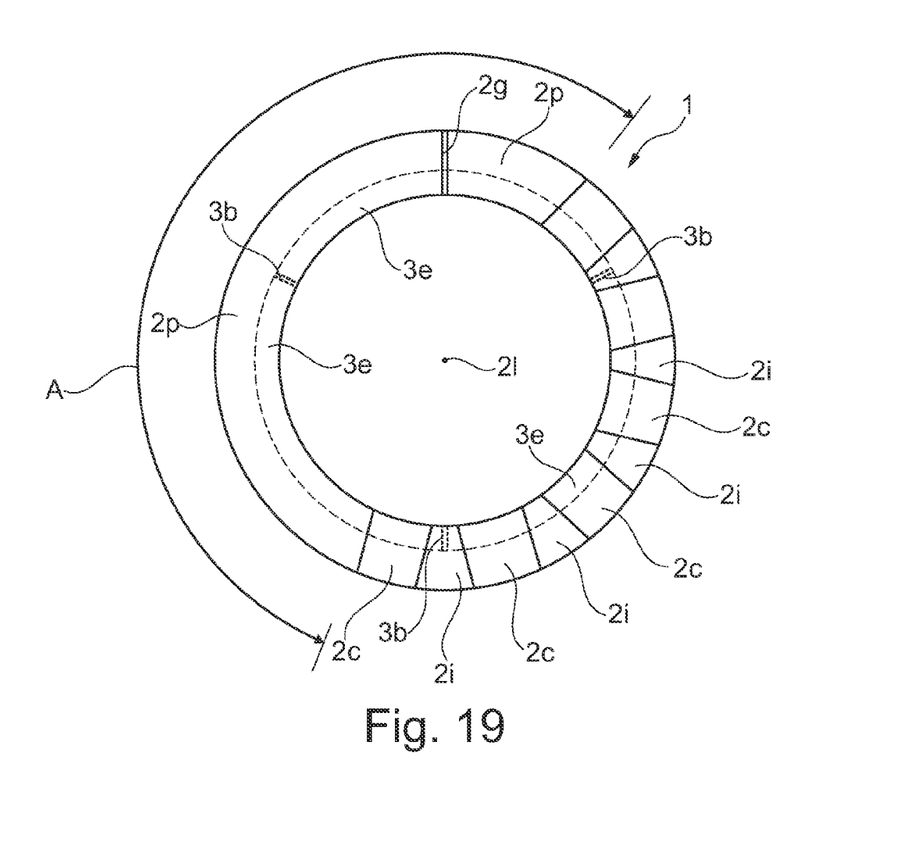
FIG. 19 a top view onto a further oil scraper ring of one piece design.

FIG. 19 shows a further embodiment of an oil scraper ring 2 which in contrast to the embodiment illustrated in FIG. 11 is of one piece design having a single abutment position 2g. Otherwise, the oil scraper ring 2 is configured as illustrated in FIG. 11 and thus also has the cross-section illustrated in FIG. 10.

Figure 18:
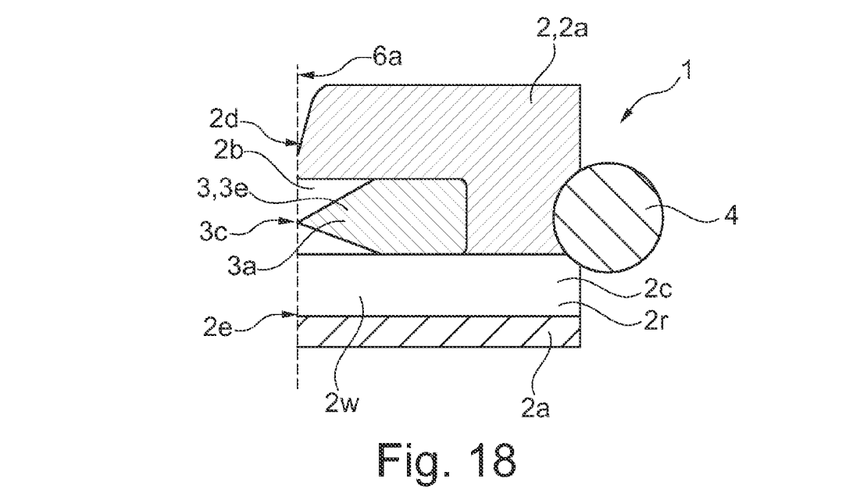
FIG. 18 a cross-section through a further embodiment of an oil scraper ring.

FIG. 18 shows a further embodiment of an oil scraper ring 2 in section which, in contrast to the embodiment illustrated in FIG. 10, has no support surface 2h, since the scraper 3 extends point-like to the center 2l and forms the contact position 3c at its tip. The passage 2c can, as illustrated by way of example in FIG. 18, also be configured as a covered passage 2r so that the covered passage 2r forms a through opening.

Figure 16:
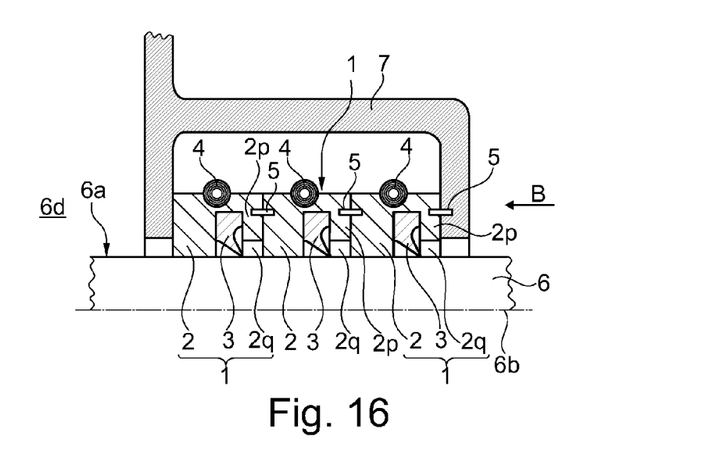
FIG. 16 a horizontally arranged package comprising three oil scraper rings arranged behind one another.
Figure 17:
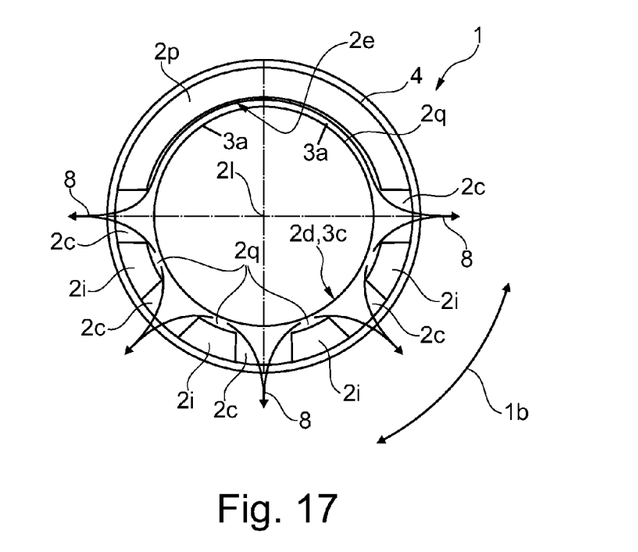
FIG. 17 a front view of an oil scraper ring illustrated in FIG. 16 from direction B.

FIG. 16 shows a horizontally running oil scraper ring package comprising three oil scraper rings 2 arranged behind one another in the direction of extent 6b of the piston rod 6. FIG. 17 shows a front view from the direction B of the oil scraper ring 2 arranged in FIG. 16. As illustrated in FIG. 17, the recessed end face 2e is, as also illustrated by dots in FIG. 10, arranged set back, so that an intermediate space 2q is formed at least between the long crown part 2p and the surface 6a of the piston rod 6. The first end face 2d as well as the contact surface 3c of the scraper lip 3a of the scraper 3 lie at the surface 6a of the piston rod 6, so that oil is scraped which, as illustrated by the fluid flow 8, escapes via the passages 2c radially outwardly. The passages 2c are arranged at the bottom in the circumferential direction at least along an angular range of 60 degrees, wherein a respective crown part 2i is arranged between two passages 2c. Advantageously each passage 2c has a width corresponding to an angular range of at least 10 degrees in the circumferential direction 2x, so that each passage 2c extends over an angular range of at least 10 degrees in the circumferential direction 2x. At the top a, for example, semicircular long crown part 2p is arranged between the passages 2c arranged between the left and the right, which long crown part 2p extends over an angular range of at least 60 degrees, wherein this long crown part 2p is configured continuously in the circumferential direction, such that the crown part 2p has no opening. This design has the advantage that the scraped oil, as illustrated by the fluid flow 8, can only escape downwardly, since the oil scraper arrangement 1 has no continuous passage 2c towards the top in the radial direction. In a particularly advantageous embodiment the oil scraper arrangement 1 arranged beside one another, as illustrated in FIG. 16, have a security against rotation, for example, a fixing pin 5, in order to prevent a rotation of the oil scraper arrangement 1 with respect to one another and in order to preferably also prevent a rotation of the oil scraper arrangement 1 with respect to the housing 7.

The oil scraper ring 2 in accordance with the invention, as illustrated in FIGS. 16 and 17, has the advantage that the drainage passages formed by the intermediate spaces 2q are not switched downstream but upstream of the scraper 3 from the direction B, so that a continuous planar surface is formed in the circumferential direction towards a compressor piston 6d. This surface acts as a sealing surface and thus prevents the exit of lubricant in the direction of extent of the piston rod 6 from the respective oil scraper ring 2. Furthermore, as illustrated in FIG. 16, advantageously no drainage passages are arranged in the direction opposing the gravity for the use in a horizontal arrangement. The scraped oil is thus, as illustrated in FIG. 17, only guided laterally and downwardly. In this way an overflow of the individual scrapers 3 or of the individual oil scraper rings 2 respectively is prevented. Advantageously, the fixing pins 5 further ensure that the scraper 3 is installed in the correct position with the sealed passages towards the top.

FIG. 19 shows a top view onto a further embodiment of an oil scraper ring 2 of one part design. The oil scraper ring 2 illustrated in FIG. 16 has a continuous crown part 2p which extends over an angular range A which can extend over an angle of between 60 degrees and 350 degrees. In the illustrated embodiment the radially running abutment position 2g extends through the crown part 2p. The abutment part 2g can, however, also be arranged such that this is not arranged in the angular range A and for this reason does not extend through the crown part 2p.

The invention claimed is:
1. An oil scraper ring assembly comprising:
   a holding ring which extends in a circumferential direction about a center and which has a longitudinal axis extending through the center, wherein the holding ring comprises:
       a first end face and a second end face oriented towards the center, wherein the first and second end faces are mutually separated by a groove running in the circumferential direction, and wherein the first end face is adapted to contact a surface of a piston rod and projects in a step-like manner further towards the center than the second end face, a first side surface, a second side surface, as well as an outer surface facing away with respect to the center, wherein the first side surface has a plurality of recesses forming a plurality of conduits extending towards the center, which conduits are mutually spaced apart in the circumferential direction and which extend in the radial direction over the complete width of the first side surface and thereby form a fluid conducting connection between the end face and the outer surface, a plurality of crown parts, each respective crown part extending in the circumferential direction and arranged between two of the plurality of conduits, wherein each crown part respectively projects over the two conduits in the direction of extent of the longitudinal axis and in this connection forms a side surface for the two conduits, wherein at least one of the crown parts is a long crown part which extends over an angular range between 60 degrees and 350 degrees in the circumferential direction, and wherein at least said long crown part forms an intermediate space between the second end face and the surface of the piston rod that is circumferentially flow connected to the two respective conduits, wherein at least said long crown part projects over the respective intermediate space in the direction of extent of the longitudinal axis such that the second end face forms a boundary wall for the intermediate space, and a scraper having a scraper lip, wherein the scraper is arranged:

in the groove of the holding ring, such that the scraper lip is oriented towards the center of the holding ring in order to scrape oil at the piston rod, and at an end of the intermediate space, in the longitudinal direction, such that the intermediate space starts at the scraper lip so that oil removed from the piston rod by the scraper lip is moved into the intermediate space;

wherein that oil scraped by the scraper lip at the end face flows through the intermediate space and escapes to the outer surface from the intermediate space via the two respective conduits.

2. The oil scraper ring assembly in accordance with claim 1, further comprising an abutment position.

3. The oil scraper ring assembly in accordance with claim 1, wherein said holding ring is composed of at least two holding ring segments which are arranged following one another in the circumferential direction and which are separated by an abutment position.

4. The oil scraper ring assembly in accordance with claim 1, wherein the scraper is composed of a plurality of scraper segments which are arranged following one another in the circumferential direction of the oil scraper ring;

wherein the holding ring has an abutment position;

wherein the first end face is made of plastic oriented towards the center of the holding ring;

wherein the scraper is composed of a material having a larger hardness than the plastic forming the first end face, wherein the scraper lip of the scraper has a contact position oriented towards the center; and wherein the scraper and the holding ring are configured mutually adapted such that both the first end face and also the contact position can lie at the piston rod, and wherein the scraper lip and the intermediate space are arranged lying next to one another.

5. The oil scraper ring assembly in accordance with claim 4, wherein the scraper is composed of three scraper segments, wherein a radially running abutment position is formed between scraper segments arranged adjacent to one another in the circumferential direction.

6. The oil scraper ring assembly in accordance with claim 1, wherein each of the conduits extends over an angular range of at least 10 degrees in the circumferential direction and is configured so as to allow a liquid to flow pass therethrough.

7. The oil scraper ring assembly in accordance with claim 4, wherein the groove of the holding ring expands towards the center such that the holding ring has a support surface in the region of the groove running transverse to the piston rod.

8. The oil scraper ring assembly in accordance with claim 1, wherein said holding ring is composed of at least a first ring part and a second ring part;

wherein the first and the second ring parts are connected to one another;

wherein the second ring part is arranged between the center and the first ring part;

wherein the second ring part is composed of a plastic; and wherein the second ring part forms the first end face.

9. The oil scraper ring assembly in accordance with claim 8, wherein the first ring part is composed of metal.

10. An oil scraper ring package comprising at least two oil scraper ring assemblies in accordance with claim 1, wherein the at least two oil scraper ring assemblies are arranged lying next to one another and mutually touching.

11. The oil scraper ring package in accordance with claim 10, wherein the at least two oil scraper ring assemblies are arranged such that the respective long crown parts are arranged extending mutually identical.

12. The oil scraper ring package in accordance with claim 10, wherein said oil scraper ring package is arranged extending horizontally, and in that the at least two oil scraper ring assemblies are arranged rotated with respect to the circumferential direction such that the respective long crown parts are arranged at the top.

13. The oil scraper ring package in accordance with claim 10, wherein at least two oil scraper ring assemblies arranged lying next to one another, have a mutual security against rotation, wherein the security against rotation is configured as a fixation pin.

14. A sealing arrangement comprising an oil scraper ring package in accordance with claim 10 and a piston rod, wherein the piston rod extends horizontally, wherein the oil scraper ring package comprises at least two oil scraper ring assemblies arranged lying next to one another in the direction of extent of the piston rod; and wherein the respective long crown parts of the oil scraper rings are arranged above the piston rod.

15. The oil scraper ring assembly in accordance with claim 1, wherein the scraper lip is formed at the end surface ending at the intermediate space, so that the scraper lip and the intermediate space are arranged lying next to one another.

16. The oil scraper ring assembly in accordance with claim 1, wherein the lower limit of the angular range is more than 180 degrees.

* * * * *